(12) United States Patent
Ash et al.

(10) Patent No.: US 7,494,135 B2
(45) Date of Patent: Feb. 24, 2009

(54) SHOPPING VEHICLE

(75) Inventors: Robert W. Ash, Andover, MN (US);
Mitchell W. Knoll, Eagan, MN (US);
William D. Splain, Brooklyn Park, MN (US); Larry S. Hubbard, Hastings, MI (US)

(73) Assignee: Target Brands, Inc., Minneapolis, MN (US)

( * ) Notice: Subject to any disclaimer, the term of this patent is extended or adjusted under 35 U.S.C. 154(b) by 316 days.

(21) Appl. No.: 11/437,837

(22) Filed: May 19, 2006

(65) Prior Publication Data

US 2007/0267829 A1 Nov. 22, 2007

(51) Int. Cl.
*B62D 39/00* (2006.01)

(52) U.S. Cl. ............. 280/33.991; 280/650; 280/33.992; 280/642

(58) Field of Classification Search ............ 280/33.993, 280/650, 33.992, 642
See application file for complete search history.

(56) References Cited

U.S. PATENT DOCUMENTS

| | | | | |
|---|---|---|---|---|
| 3,044,801 | A | * | 7/1962 | Vicany ........................ 280/202 |
| 3,170,709 | A | | 2/1965 | Shackel |
| 3,497,234 | A | | 2/1970 | Schray |
| D230,142 | S | | 1/1974 | Muellner |
| 3,885,806 | A | | 5/1975 | Trubiano |
| 4,305,601 | A | | 12/1981 | Berge |
| 4,381,870 | A | | 5/1983 | Muellner |
| 4,484,755 | A | | 11/1984 | Houston |
| 4,601,479 | A | | 7/1986 | Reinbold et al. |
| 4,721,317 | A | | 1/1988 | Avot |
| 4,771,840 | A | | 9/1988 | Keller |
| 4,976,447 | A | | 12/1990 | Batson |
| D318,550 | S | | 7/1991 | Stefano |
| 5,149,114 | A | | 9/1992 | Lewandowski et al. |
| D331,135 | S | | 11/1992 | Lewandowski et al. |
| 5,312,122 | A | * | 5/1994 | Doty ..................... 280/33.992 |
| D357,105 | S | | 4/1995 | Reiland et al. |
| 5,409,245 | A | | 4/1995 | Kern et al. |
| D365,904 | S | | 1/1996 | Adamson et al. |

(Continued)

FOREIGN PATENT DOCUMENTS

WO    WO 02/068254 A1    9/2002

(Continued)

OTHER PUBLICATIONS

Shopper's Aid™II brochure by Mart Cart, available prior to May 19, 2006. 2 pgs.

(Continued)

*Primary Examiner*—Christopher Ellis
*Assistant Examiner*—Cynthia F Collado
(74) *Attorney, Agent, or Firm*—Faegre & Benson LLP

(57) ABSTRACT

A shopping vehicle includes a wheeled chassis supporting a main cart and a utility portion. The main cart includes a front portion and a rear portion with the utility portion extending rearward from the rear portion of the main cart. The utility portion includes a generally horizontal platform and a generally vertical support structure. The support structure extends generally upward and generally perpendicular relative to the generally horizontal platform. The platform and the support structure of the utility portion, in combination with the rear portion of the main cart define a first cargo zone behind the main cart.

20 Claims, 7 Drawing Sheets

U.S. PATENT DOCUMENTS

| | | | |
|---|---|---|---|
| 5,595,394 A | 1/1997 | Adamson | |
| D386,873 S | 11/1997 | Langlois D'Estaintot et al. | |
| 5,823,548 A | 10/1998 | Reiland et al. | |
| 5,882,021 A | 3/1999 | Reiland et al. | |
| 5,918,891 A * | 7/1999 | Russell | 280/33.991 |
| 6,022,031 A | 2/2000 | Reiland et al. | |
| 6,086,085 A | 7/2000 | Larsson | |
| 6,126,181 A | 10/2000 | Ondrasik | |
| 6,237,924 B1 | 5/2001 | Reiland et al. | |
| 6,270,093 B1 | 8/2001 | Johnson et al. | |
| 6,364,325 B1 | 4/2002 | Chalfant | |
| 6,364,326 B1 | 4/2002 | Reiland et al. | |
| 6,378,891 B1 | 4/2002 | Maher et al. | |
| 6,464,238 B2 | 10/2002 | Reiland et al. | |
| 6,513,817 B2 | 2/2003 | McCue et al. | |
| 6,572,122 B2 | 6/2003 | Johnson et al. | |
| 6,575,480 B2 * | 6/2003 | McKelvey | 280/33.993 |
| 6,585,284 B2 * | 7/2003 | Sweeney et al. | 280/650 |
| 6,641,147 B2 | 11/2003 | Werner | |
| 6,644,674 B2 | 11/2003 | Simard | |
| 6,702,313 B2 | 3/2004 | Forshee et al. | |
| D520,209 S | 5/2006 | Duchene | |
| D526,106 S | 8/2006 | Tucker et al. | |
| D526,107 S | 8/2006 | Duchene | |
| 7,093,841 B2 * | 8/2006 | Conrad | 280/33.993 |
| 2001/0035619 A1 | 11/2001 | Reiland et al. | |
| 2002/0093179 A1 | 7/2002 | McKelvey | |
| 2002/0117820 A1 | 8/2002 | McCue et al. | |
| 2005/0006877 A1 | 1/2005 | Kachkovsky | |
| 2005/0218613 A1 | 10/2005 | Giampavolo et al. | |

FOREIGN PATENT DOCUMENTS

| | | |
|---|---|---|
| WO | WO 2004/037684 A2 | 5/2004 |
| WO | WO 2005/079438 A2 | 9/2005 |
| WO | WO 2006/091445 A2 | 8/2006 |

OTHER PUBLICATIONS

Flop Top Cart brochure by Rehrig International, available prior to May 19, 2006. 2 pgs.
Bob Cart Series brochure by Rehrig International, available prior to May 19, 2006. 1 pg.
RTS Shuttle brochure by RTS Plastics, Inc., available prior to May 19, 2006. 2 pgs.
Race Cart brochure by RTS Plastics, Inc., available prior to May 19, 2006. 2 pgs.
Nestable Shop-Along®II publication by Safe-Strap Company, Inc., 2004. 2 pgs.

* cited by examiner

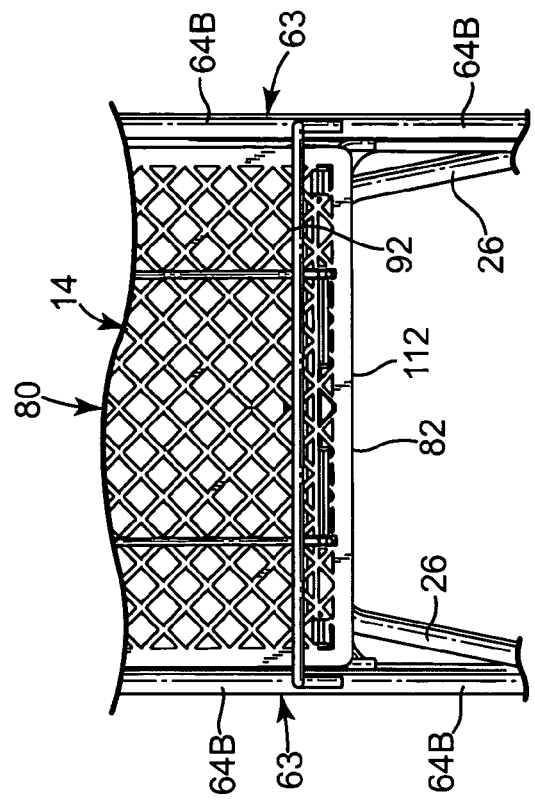
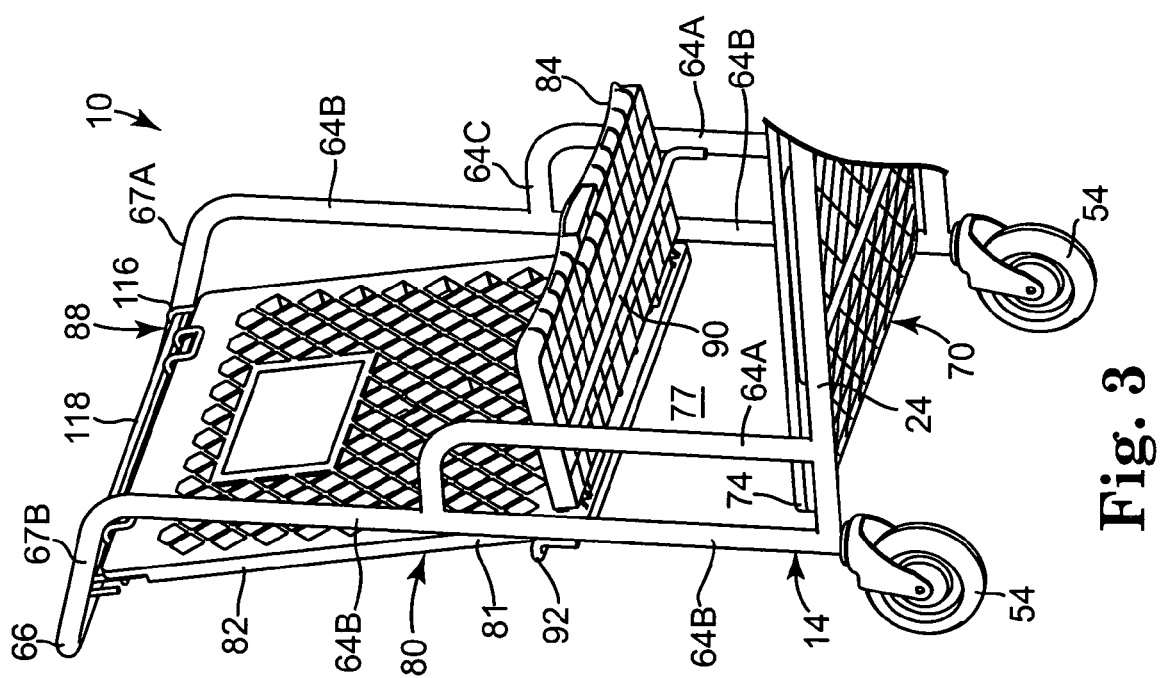

SHOPPING VEHICLE

BACKGROUND OF THE INVENTION

Retailers devote considerable resources to shaping a customer's experience within a retail store to make shopping easier, more comfortable, and attractive. Of paramount concern to retailers is facilitating a customer's selection, transportation, and purchasing of goods within those stores. Accordingly, upon entering virtually any retail store, a customer is greeted by a fleet of shopping carts from which the customer selects a cart before embarking on their journey through the store.

One significant development among retailers is the advent of the superstore, in which customers can now shop for a complete selection of groceries, as well as a larger stock of general merchandise. As customers spend increasingly longer times in superstores, retailers are mindful of making the shopping experience appealing to children to encourage their parents to spend more time in the store. Some retailers have offered specialized children's carts including add-on portions for seating children. However, these conventional children's carts significantly increase the length of the cart, without increasing the storage capacity of the cart, and also make these carts more difficult for store personnel to collect and store.

With the greater volume of items purchased in superstores, as well as the move to purchasing items in bulk quantities, conventional carts or conventional children's carts frequently lack capacity to handle the bulk of items purchased or larger sized items.

Given their high profile in the retail environment and their impact on the experience of the consumer, shopping carts should better serve to meet the needs and wants of consumers.

SUMMARY OF THE INVENTION

Embodiments of the invention are directed to a shopping vehicle. In one embodiment, a shopping vehicle includes a wheeled chassis supporting a main cart and a utility portion. The main cart includes a front portion and a rear portion with the utility portion extending rearward from the rear portion of the main cart. The utility portion includes a generally horizontal platform and a generally vertical support structure. The support structure extends generally upward and generally perpendicular relative to the generally horizontal platform. The platform and the support structure of the utility portion, in combination with the rear portion of the main cart define a first cargo zone behind the main cart.

BRIEF DESCRIPTION OF THE DRAWINGS

Embodiments of the invention will be described with respect to the figures, in which like reference numerals denote like elements, and in which:

FIG. 3 is a partial perspective view of a shopping vehicle, according to an embodiment of the invention.

FIG. 4 is a partial plan view of a rear portion of a shopping vehicle, according to an embodiment of the invention.

DETAILED DESCRIPTION

Figure 1:
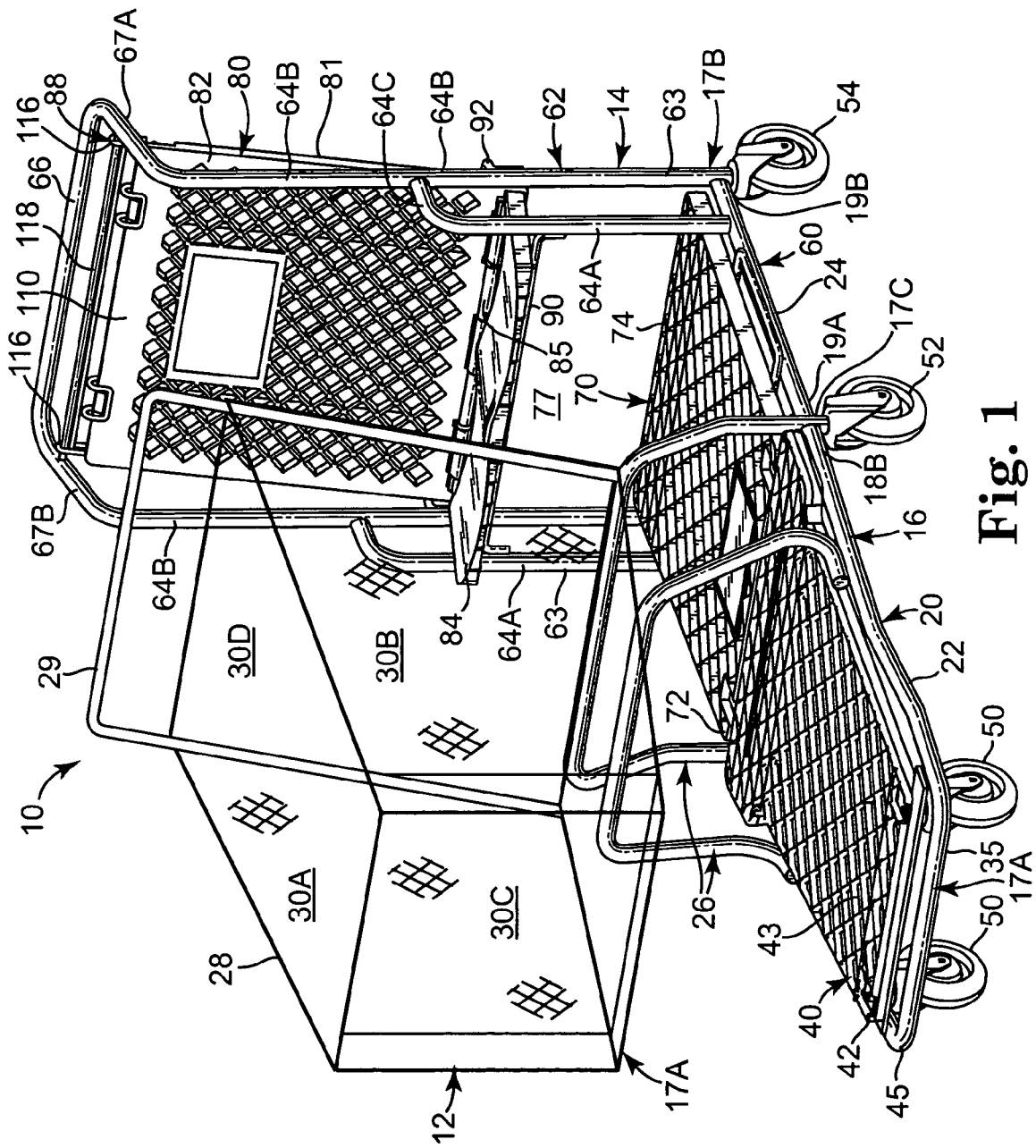
FIG. 1 is a perspective view of a shopping vehicle, according to an embodiment of the invention.

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments of the invention are directed to a shopping vehicle. In one embodiment, the shopping vehicle comprises a main cart and a utility portion, and is convertible between a cargo mode and a passenger mode. In the cargo mode, the utility portion of the shopping vehicle is primarily adapted to storing or transporting items in a first cargo zone and/or a second cargo zone. In the passenger mode, the utility portion of the shopping vehicle is primarily adapted for carrying passengers, such as small children.

In one embodiment, the main cart comprises a basket and a tray spaced from and disposed below the basket. The utility portion extends rearward from the main cart of the shopping vehicle enabling larger items to be stowed externally of the basket of the main cart in either a first cargo zone and/or a second cargo zone of the shopping vehicle. The first cargo zone is generally provided by the shopping vehicle via a generally horizontal platform of the utility portion. The first cargo zone extends across and above the platform of the utility portion, extending from the rear of the main cart rearward to a generally vertical support structure at the rear of the utility portion. In one aspect, the platform has a low height relative to the ground over which the shopping vehicle travels, thereby enhancing the ability of the customer to maneuver larger or heavier items onto the shopping vehicle for placement in the first cargo zone.

In one aspect, the support structure of the utility portion extends generally vertically upward from and generally perpendicular to the generally horizontal platform and the support structure includes a handle portion. In another aspect, a panel is pivotally mounted to the support structure for pivotal movement between a first position in which the panel is generally parallel to the support structure and a second position in which the panel is in a generally horizontal position spaced above the platform and generally perpendicular to the support structure. In its first position, the panel provides an additional boundary to constrain items within the first cargo zone. The panel is pivotally moved to the second position upon forcible nesting of a front portion of another shopping cart (or shopping vehicle) into the utility portion of the shopping vehicle that pushes the panel upward from the first position to the second position. As described further below, in one embodiment, the panel comprises a seat assembly.

The shopping vehicle also provides a second cargo zone adapted for receiving longer articles and is defined by both the main cart and the utility portion. The second cargo zone is defined by a combination of a tray of the main cart and the platform of the utility portion. The second cargo zone extends substantially continuously through the shopping vehicle defining a generally unobstructed passageway from the front portion of the main cart, between the basket and the tray of the main cart, over the platform of the utility portion, and through the support structure of the utility portion at the rear portion of the utility portion of the shopping vehicle.

In another embodiment, the panel of the utility portion of the shopping vehicle comprises a seating assembly including a backrest and a seat portion. The backrest is pivotally mounted relative to the support structure of the utility portion via a first pivot mechanism and the seat portion is pivotally mounted relative to the backrest via a second pivot mechanism. In a first mode of use of the seat assembly, the backrest extends generally vertically and generally parallel to the support of the utility portion and the seat portion of the seat assembly is releasably locked in a closed, storage position in which the seat portion is generally parallel to the backrest. In this first mode of use, the closed position of the seat portion of the seat assembly maximizes the available volume in the first cargo zone on the platform of the utility portion of the shopping vehicle. In one aspect, this closed, storage position of the seat assembly also provides a low profile to the seat assembly to facilitate nesting of multiple carts together, as described further below. In another aspect, the support structure comprises a first transverse bar that extends at least partially across the rear portion of the utility portion to limit rearward pivotal movement of the seat assembly relative to the support when the seat assembly is in the first mode of use.

In a second mode of use of the seat assembly, with the backrest remaining in its generally vertical position, the seat portion of the seat assembly is released from the closed storage position to pivotally move downward into in an open, in-use position in which the seat portion is generally perpendicular to the backrest. In one aspect, the support structure comprises a second transverse bar that extends at least partially across the utility portion to further support the seat portion to bear the weight of persons seated on the seat portion. In addition, the platform acts as a footrest to further support a person seated on the seating assembly.

In this second mode of use of the seat assembly, children can easily step on and off the platform to access the seating assembly. This feature also saves parents from having to lift their children up onto an elevated child seating area and/or avoids possibility of child climbing up to an elevated seat portion. According, a child sitting on the seat assembly of the shopping vehicle is well supported with a significant backrest and a footrest provided by the platform of the utility portion.

Accordingly, when larger items are not stowed in the first cargo zone or the second cargo zone, the shopping vehicle is quickly converted from a cargo mode to a passenger mode by folding down a seat portion of a seating assembly mounted at the support handle at the rear of the utility portion. A child can step onto the base platform and then sit down on the seat portion (with an accompanying backrest) for riding securely on the shopping vehicle via the customary safety harness. Conversely, the shopping vehicle quickly converts from a passenger mode back to a cargo mode by folding up the seat portion of the seat assembly to its releasably locked, closed position and then proceeding to load items into the first cargo zone and/or the second cargo zone.

These embodiments, and additional embodiments, are described in association with FIGS. 1-8.

Figure 2:
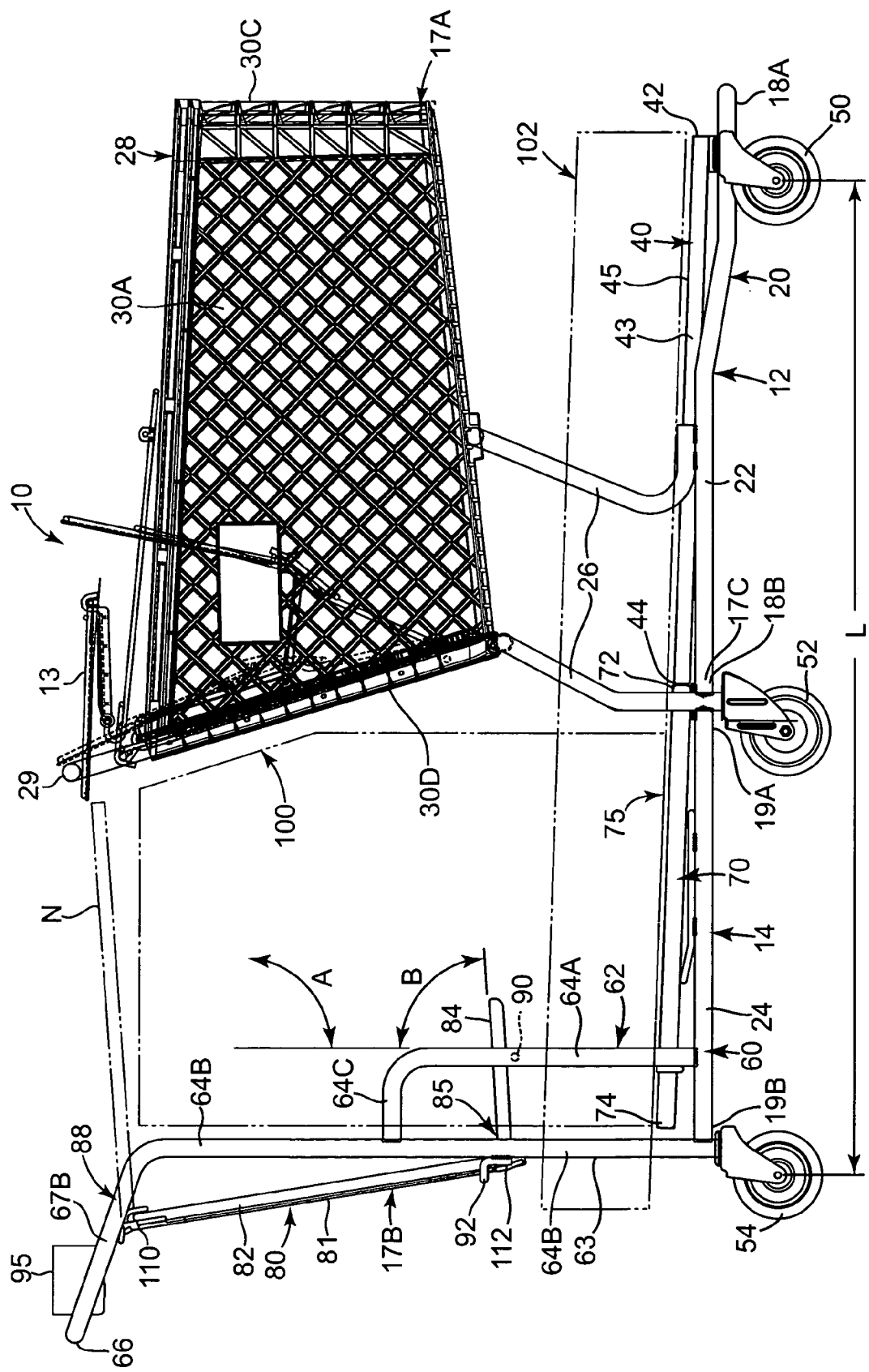
FIG. 2 is a side plan view of a shopping vehicle, according to an embodiment of the invention.

FIGS. 1-2 illustrate a shopping vehicle 10, according to one embodiment of the invention. FIG. 1 is a perspective view of shopping vehicle 10 and FIG. 2 is a plan side view of shopping vehicle 10 of FIG. 1.

As shown in FIGS. 1-2, shopping vehicle 10 comprises a main cart 12 and a utility portion 14, each being supported by and partially defined by a wheeled chassis 16. Shopping vehicle 10 comprises a front portion 17A, a midportion 17C, and a rear portion 17B. In addition, main cart 12 includes a front portion 18A and a rear portion 18B while utility portion 14 includes a front portion 19A and a rear portion 19B. Midportion 17C of shopping vehicle 10 generally corresponds to a junction between rear portion 18B of main cart 12 and front portion 19A of utility portion 14.

In one aspect, wheeled chassis 16 comprises frame 20 which includes a front portion 22 and a rear portion 24, and which supports front wheels 50, center wheels 52, and rear wheels 54. Center wheels 52 are generally disposed between and spaced from front wheels 50 and rear wheels 54, and are positioned adjacent midportion 17C of shopping vehicle 10 generally between main cart 12 and utility portion 14 of shopping vehicle 10.

In one aspect, main cart 12 of shopping vehicle 10 comprises basket 28 and tray 40 as supported by front portion 22 of frame 20 of wheeled chassis 16 (including front wheels 50 and center wheels 52). Basket 28 is spaced above tray 40 and is supported by frame members 26 of main cart 12, which extend generally upwardly from frame 20. In one aspect, basket 28 also comprises a handle 29. In one aspect, basket 28 is illustrated in FIG. 1 in dashed lines to indicate that basket 28 comprises any one of a number of different styles of baskets 28 for a main cart 10, such as a metal basket or a plastic basket. Moreover, in another aspect, each panel 30A-30D of the basket 28 comprises a panel defining a latticework of ribs defining round shaped holes, a diamond shaped holes, and/or square shaped holes, etc. Accordingly, the shopping vehicle 10 is not limited to the particular type of basket 28 incorporated into main cart 12. In another aspect, as illustrated in FIGS. 1-2, tray 40 of main cart 12 comprises front portion 42 and rear portion 44 (FIG. 2). Tray 40 is supported by front portion 22 of frame 20 of wheeled chassis 16 and extends from front portion 18A of main cart 12 to rear portion 18B of main cart 12.

In one aspect, main cart 12 comprises a conventional shopping cart configured for stand-alone use separate from utility portion 14 and to which utility portion 14 is either permanently attached or removably attachable via connection of front portion 19A of utility portion 14 to rear portion 18B of main cart 12. In this aspect, utility portion 14 acts as a conversion unit (e.g., a wagon or trailer) attachable to main cart 12 for converting the main cart 12 into a shopping vehicle for hauling items or people in addition to capabilities of main cart 12. In another aspect, utility portion 14 forms a portion of a single integrated vehicle 10 inseparable from main cart 12. In either case, utility portion 14 functions in its cargo mode like a bed of a pickup or a cargo hold or functions in its passenger mode like an expanded seating vehicle. In one aspect, as illustrated in FIG. 2, main cart 12 additionally comprises a conventional child seat 13 (shown in a collapsed state) for seating children in main cart 12 in addition to seating functions provided via utility portion 14.

In another aspect, as illustrated in FIGS. 1-2, utility portion 14 of shopping vehicle 10 extends rearward from main cart 12 and is supported by rear portion 24 of frame 20 including rear wheels 54 (of wheeled chassis 16). Utility portion 14 comprises, but is not limited to, platform 70, support structure 62, and seat assembly 80. In one aspect, center wheels 52 additionally define and support utility portion 14 of shopping vehicle 10.

Platform 70 of utility portion 14 comprises front portion 72 and rear portion 74. Platform 70 is supported by and connected onto rear portion 24 of frame 20 (of wheeled chassis 16) and extends from front portion 19A of utility portion 14 to rear portion 19B of utility portion 14. In one aspect, as illustrated in FIG. 2, platform 70 of utility portion 14 generally defines a first cargo zone 100 (generally indicated by a dashed box) for removably receiving articles, which can be stacked or otherwise loaded onto platform 70. The first cargo zone 100 is not strictly defined by the shape of the dashed box shown in FIG. 2. However, the dashed box facilitates visualizing the boundaries of the first cargo zone 100 relative to the various components of the utility portion 14 and main cart 12 that define first cargo zone 100. In one aspect, the first cargo zone 100 is defined by platform 70, as it extends rearward from the rear portion 18B (e.g., rear gate 30D of basket 28) of main cart 12 (and from front portion 19A of utility portion 14) to the rear portion 19B of utility portion 14 adjacent support structure 62. In one aspect, the platform 70 occupies substantially the entire footprint of the utility portion 14 of the shopping vehicle 10 so that the utility portion 14 is free from any significant gaps between platform 70 of utility portion 14 and tray 40 of main cart 12. In another aspect, the platform 70 is sized and shaped to provide a small gap between the platform 70 and tray 40 of main cart 10.

In another aspect, as illustrated in FIG. 2, platform 70 of utility portion 14 in combination with tray 40 of main cart 12 defines a second cargo zone 102 (generally indicated by a dashed box). As shown in FIG. 2, tray 40 of main cart 12 has an upper surface 45 that is substantially flat and that extends in a generally singular plane while platform 70 of utility portion 14 has an upper surface 75 that extends in generally the same singular plane as tray 40 of main cart 12. In one aspect, one or both of tray 40 and platform 70 have a substantially uniform thickness. When arranged end-to-end as shown in FIGS. 1-2, tray 40 of main cart 12 and platform 70 of utility portion 14 define a substantially continuous support surface, and a substantially continuous, unobstructed passageway at a bottom portion of shopping vehicle 10 to define second cargo zone 102. The second cargo zone 102 extends over tray 40 of main cart (i.e. below basket 28), over platform 70 of utility portion 14 (and underneath seat assembly 80) and through opening 77 of support structure 62 of utility portion 14.

In one aspect, rear portion 17B of main cart 12 below panel 30D of basket 28 (and above tray 40) is free from any cross members extending transversely between legs 26 on opposite sides of main cart 12 so that the opening above tray 40 adjacent rear portion 17B of main cart 12 has a size and shape generally corresponding to the opening 77 in support structure 62 of utility portion 14. This feature facilitates the unobstructed nature of the passageway comprising the second cargo zone 102 to enable longer articles to extend freely through both the main cart 12 and the utility portion 14.

In another aspect, the rear portion 44 of tray 40 has a thickness and/or height that substantially matches a thickness or height of a body 43 of tray 40 so that rear portion 44 of tray 40 does not define any vertical barrier restricting placement of articles that extend between tray 40 of main cart 12 and platform 70 of utility portion 14. Accordingly, with this arrangement, the second cargo zone 102 of shopping vehicle 10 provides a substantially unobstructed passageway for placement of longer articles that extend through both main cart 12 and utility portion 14.

In one embodiment, platform 70 of utility portion 14 comprises a latticework of ribs providing platform 70 with a lightweight, strong structure that also enables quick drainage from rain or water. In one aspect, the rib structure of platform 70 is selected to generally match a rib structure of one or more panels 30A-30D of basket 28 and/or a rib structure of tray 40 of main cart 12. In another embodiment, tray 40 of main cart 12 and platform 70 of utility portion 14 are formed as a single unitary member instead of as separate members arranged end-to-end (as currently illustrated and described in association with FIGS. 1-2).

In one embodiment, as illustrated in FIGS. 1-2, utility portion 14 comprises base frame 60 and generally vertical support structure 62. Base frame 60 is generally defined by rear portion 24 of frame 20 of shopping vehicle 10. Support structure 62 extends generally vertically upward and generally perpendicular relative to the base frame 60. In another aspect, support structure 62 extends at angles other than generally perpendicular relative to base frame member 60. In one aspect, support structure 62 comprises a pair of side portions 63 arranged at opposite sides of utility portion 14 adjacent rear portion 19B of utility portion 14. Each respective side portion 63 of support structure 62 includes a first vertical portion 64A and a second vertical portion 64B with the side portions 63 being joined together via handle 66 that extends generally transversely across the utility portion between the two side portions 63.

In one embodiment, as illustrated in FIG. 2, support structure 62 comprises first vertical portion 64A and second vertical portion 64B of each side portion 63 extending generally parallel to each other with an upper portion 64C of first vertical portion 64A forming a generally horizontal bridge to connect to second vertical portion 64B. In one aspect, this bridge 64C (e.g. upper portion 64C) provides a handle for seat assembly 80 for grasping by passengers riding on utility portion 14 of shopping vehicle 10. Second vertical portion 64B of each respective side portion 63 extends generally vertically upward and extends rearward into a side portion 67A, 67B of handle 66.

In another embodiment, support structure 62 additionally comprises a first transverse bar 90 and second transverse bar 92 to act as additional supports for use with a seat assembly 80. First transverse bar 90 extends across rear portion 19B of utility portion 14 between the respective first vertical portions 64A of support structure 62 while second transverse bar 92 extends across rear portion 19B of utility portion 14 between the respective second vertical portions 64B of support structure 62. In one aspect, first transverse bar 90 and second transverse bar 92 are positioned at approximately the same height above platform 70, with second transverse bar 92 spaced a little higher than first transverse bar 90. In another aspect, second transverse bar 92 and second vertical portions 64B on opposite side portions 63 define opening 77 above rear portion 74 of platform 70 to further define second cargo zone 102, and through which items may extend or be inserted and removed.

FIG. 3 further illustrates first transverse bar 90 as it extends transversely between first vertical portions 64A of each respective side portion 63 on opposite sides of shopping vehicle 10. First transverse bar 90 is positioned to vertically support seat portion 84 to support the weight of a person sitting on the seat portion 84 and, in cooperation with backrest 82, maintains seat portion 84 in a generally horizontally position to enable sitting on seat assembly 80. FIG. 4 further illustrates second transverse bar 92 as it extends transversely across rear portion 19B of utility portion 14 and between second vertical portions 64B of each respective side portion 63 on opposite sides of cart 10. Second transverse bar 92 is positioned to prevent rearward movement of backrest 82 of seat assembly 80 relative to second vertical portion 64B of support structure. This arrangement insures proper positioning of seat assembly 80 upon release from nesting, support for a person seated on seat portion 84, and/or support for backrest 82 to hold items placed on platform 70 in the first cargo zone 100 as further described below.

In one embodiment, as illustrated in FIGS. 1-2, utility portion 14 of shopping vehicle 10 comprises a panel 81 mounted relative to support structure 62 to further constrain articles loaded on platform 70 within the first cargo zone 100. In one embodiment, panel 81 is provided by seat assembly 80 (including its backrest 82 and seat portion 84), with the entire seat assembly 80 acting as a panel. However, in other embodiments, the panel comprises a generally rectangular member such as backrest 82 without a seat portion 84. In another embodiment, panel 81 comprises a member that is not a seat assembly 80 but that is also supportable on support structure 62 in a position, and with a size and shape to prevent items from passing through support structure 62 when those items are positioned on platform 70 of utility portion 14.

As shown in FIGS. 1-3, in one embodiment, seat assembly 80 comprises backrest 82 and seat portion 84. Backrest 82 includes a top portion 110 and a bottom portion 112. Top portion 110 of backrest 82 is pivotally mounted to side portions 67A, 67B of handle 66 of support structure 62 via a first pivot mechanism 88. In one aspect, first pivot mechanism 88 comprises a pair of hooks 116 extending upward from top portion 110 of backrest 82 (on opposite sides of backrest 82) and configured to slidably rotate about a bar 118 extending transversely between opposite side portions 67A, 67B of handle 66. In another aspect, any one of various other pivot mechanisms is employed for pivotally connecting top portion 110 of backrest 82 relative to an upper portion of support structure 62 adjacent handle 66.

In one aspect, as illustrated in FIG. 2, the entire seat assembly 80 is pivotally movable (as indicated by directional arrow A) via first pivot mechanism 88 from a generally vertical position shown in FIGS. 1-2 to a generally horizontal, nesting position as represented by dashed box N. This pivotal movement is initiated by and sustained by advancing a front portion of a second shopping cart to contact and push the seat assembly 80 upward into the generally horizontal position (N) to permit nesting of multiple carts together. Upon removal of the second shopping cart from the nested position, seating assembly 80 pivotally moves downward, via gravitational forces, back to the position shown in FIGS. 1 and 2.

In another embodiment, as illustrated in FIG. 2, utility portion 14 additionally comprises a small items holder 95 mounted adjacent handle 66 of support structure 62 for the convenience of the user to store personal items during use of shopping vehicle 10. In one aspect, small items holder 95 is positioned adjacent top portion 110 of backrest 82 but spaced rearward from backrest 82 to avoid interfering with pivoting action of backrest 82 during a nesting of other carts with utility portion 14 of shopping vehicle 10.

In another aspect, as illustrated in FIG. 1-2, backrest 82 and seat portion 84 of seat assembly 80 are pivotally connected to each other via a second pivot mechanism 85, which is described and illustrated in greater detail in association with FIGS. 5A-8, to enable seat portion 84 to be movable between a releasably lockable, generally vertically upright storage position (FIG. 5A) and a generally horizontal seating position (FIGS. 1-3).

Accordingly, as shown in FIGS. 1-2, shopping vehicle 10 enables storage and transport of articles in a first cargo zone 100, a second cargo zone 102, or a combination of first cargo zone 100 and second cargo zone 102. In one embodiment, first cargo zone 100 is employed when seat assembly 80 is in a closed, storage position. In another embodiment, first cargo zone 100 is employed when seat assembly 80 is in an open, in-use position (FIGS. 1-3) without a child seated on the seat assembly 80 by placing smaller, lightweight items on the seat portion 84.

Additional aspects of seat assembly 80 of the utility portion 14 of shopping vehicle 10 are illustrated and described in association with FIGS. 5A-8.

Figure 5A:
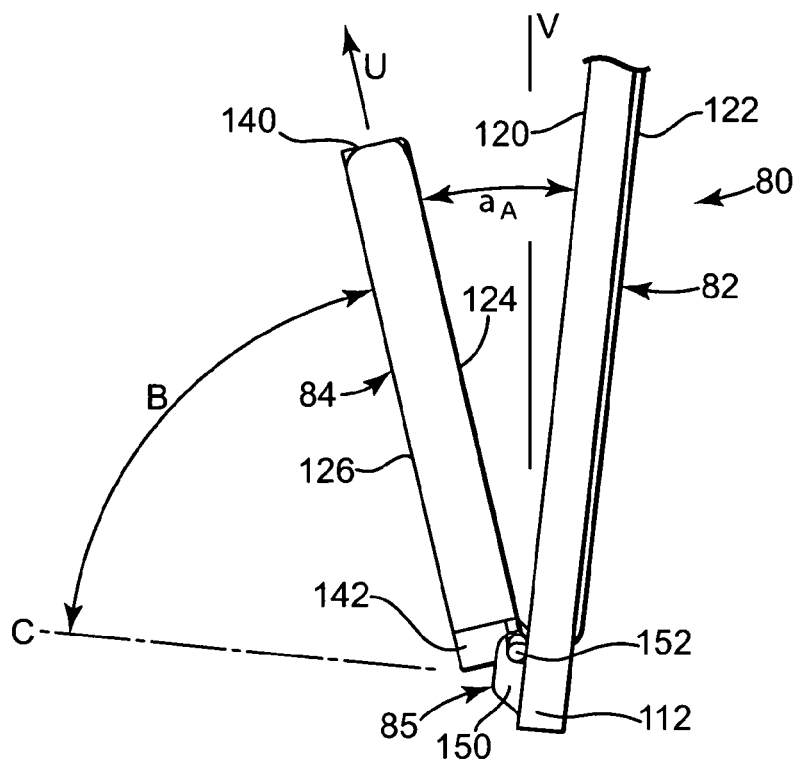
FIG. 5A is a side plan view of a seat assembly of a shopping vehicle, according to an embodiment of the invention.

FIG. 5A is a side plan view of seat assembly 80. As shown in FIG. 5A, seat assembly 80 comprises backrest portion 82 and seat portion 84 joined together via pivot mechanism 85 for pivotal movement between the generally horizontal seating position (represented by line C in FIG. 5A) as illustrated in FIGS. 1-3 and the generally vertically upright storage position illustrated in FIG. 5A.

As illustrated in FIG. 5A, backrest portion 82 comprises front surface 120 and rear surface 122 and seat portion 84 comprises upper surface 124 and lower surface 126. In addition, backrest portion 82 also comprises top portion 110 (FIGS. 1-3) and bottom portion 112 while seat portion 84 comprises outer end 140 and inner end 142.

In one aspect, as illustrated in FIG. 5A, pivot mechanism 85 comprises a slot mechanism 150 disposed at bottom portion 112 of backrest 82 and at least one flange 152 disposed at inner end 142 of seat portion 84. Seat portion 84 becomes releasably locked in a generally closed, storage position shown in FIG. 5A, upon flange(s) 152 being slidably inserted into slot mechanism 150 of backrest 82 of seat assembly 80. As illustrated in FIG. 5A, upon hand-controlled movement of seat portion 84 outward from backrest 82 as represented by directional arrow U, the flange(s) 152 is slidably removed from the slot mechanism 150 so that seat portion 84 is pivotally moved downward into the generally horizontal seating position. The size and shape of the flange(s) 152 and of the slot mechanism 150 are selectable at the time of construction to control the respective ease or difficulty of flange(s) 152 being released from the slot mechanism. For example, the longer the flange(s) 152 and the deeper the slot mechanism 150, the more force and hand action is require to release seat portion 84 from its releasably locked position relative to backrest 82. Conversely, the shorter the flange(s) 152 and/or the shallower the slot mechanism 150, the less force and hand action is required to release seat portion 84 from its releasably locked position. This arrangement enables one to select, at the time of manufacture, how readily seat portion 84 will be releasable from backrest 82 to meet the goals of the store offering shopping vehicle 10.

Figure 5B:
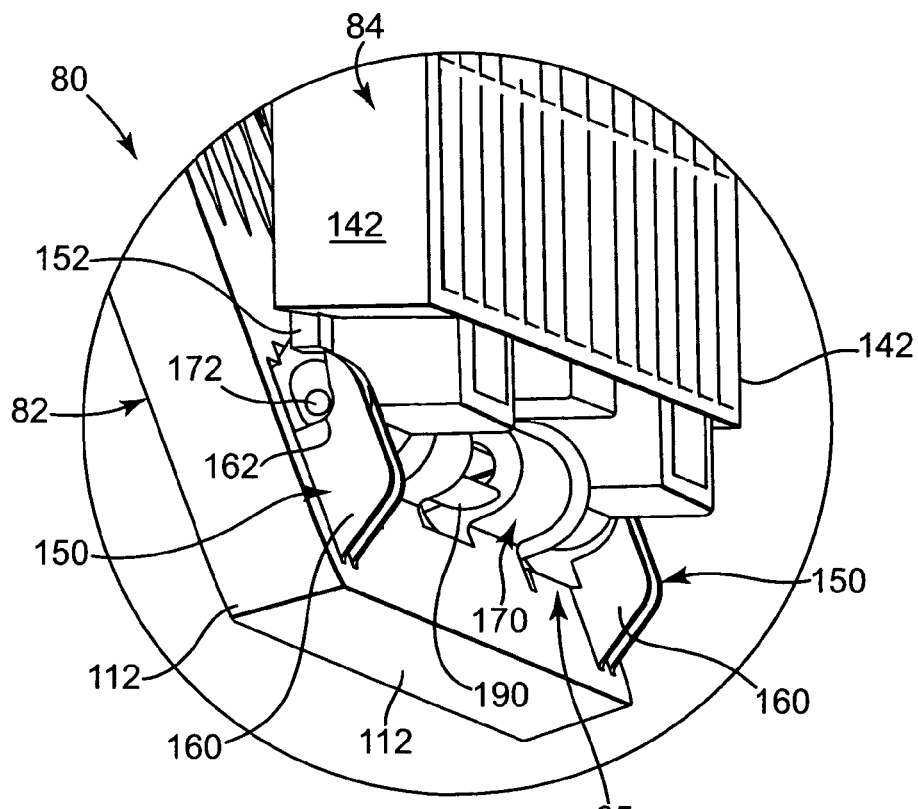
FIG. 5B is an enlarged partial view of the seat assembly of the shopping vehicle of FIG. 5A, according to an embodiment of the invention.

According, seat assembly 80 is readily convertible via simple hand-controlled pivoting, as represented by directional arrow B, between the generally horizontal position in FIGS. 1-3 (also represented by dashed line C) and the generally vertically upright position of FIG. 5A-5B.

In another aspect, as illustrated in FIG. 5A, seat assembly 80 is positioned relative to support structure 62 (FIGS. 1-3) so that backrest 82 is tilted slightly rearward from a vertical plane V in a reclined position to make sitting on seat assembly 80 more comfortable. In another aspect, as illustrated in FIG. 5A, seat portion 84 and backrest 82 define an angle $\alpha_A$ of separation when seat assembly 80 is in its closed position to place the seat portion 84 in a generally vertical upright position relative to vertical plane V. This angle $\alpha_A$ is selectable at the time of manufacture, based on the size and shape of slot mechanism 150 to achieve the desired level of verticality of seat portion 84 and the desired level of closeness of seat portion 84 to backrest 82 when seat assembly 80 is in the closed position.

FIG. 5B is an enlarged view of the seat assembly of FIG. 5A. As illustrated in FIG. 5B, slot mechanism 150 of backrest 82 comprises a body 160 disposed on opposite sides of backrest 82 adjacent bottom portion 112 of backrest 82 with each respective body 160 defining a slot 162. Flanges 152 are disposed on opposite sides of seat portion 82 adjacent inner end 142 of seat portion 84.

In another aspect, FIG. 5B also illustrates one rotational position of seat portion 84 relative to backrest 82 as seat portion 84 is maneuvered relative to backrest 82. In this position, flange 152 of seat portion 84 is positioned outside of slot 162 of backrest 82, thereby permitting pivoting of seat portion 84 outward and downward relative to backrest 82 to its generally horizontal seating position. In addition, in this rotational position, seat portion 82 also is positioned for slidable insertion of flange 152 of seat portion 84 into slot 162 of backrest 82 to releasably lock seat portion 84 relative to backrest 82 in its generally vertical upright storage position.

In another aspect, as illustrated in FIG. 5B, second pivot mechanism 85 of seat assembly 80 comprises a first engaging portion 170 of backrest 82 and a second engaging portion 190 of seat portion 84, both of which are described and illustrated in more detail in association with FIGS. 6A-8.

Figure 6A:
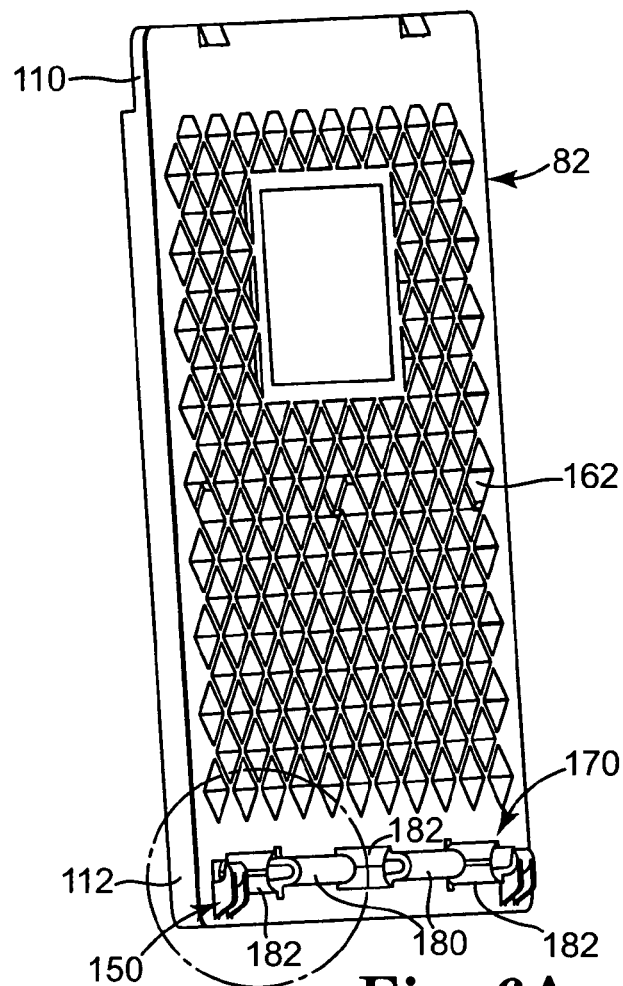
FIG. 6A is a perspective view of a backrest of a seat assembly of a shopping vehicle, according to an embodiment of the invention.
Figure 6B:
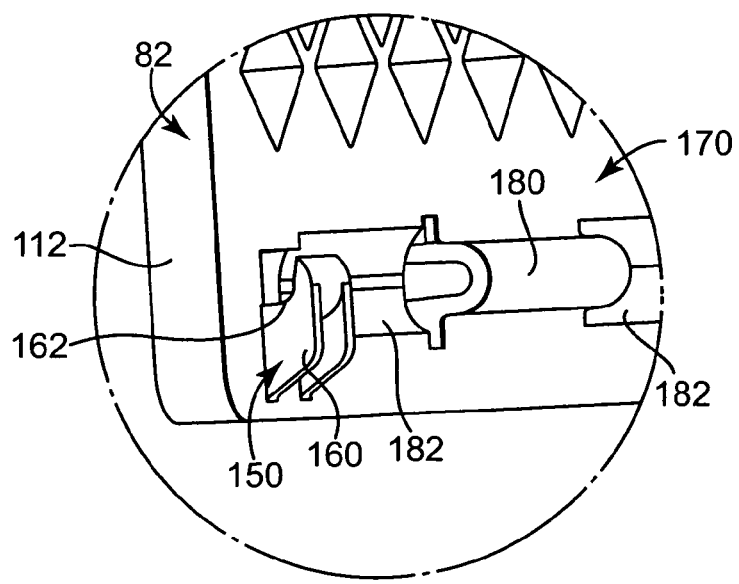
FIG. 6B is an enlarged perspective view of the backrest portion of FIG. 6A, according to an embodiment of the invention.

FIG. 6A is a perspective view of backrest 82 of seat assembly 80, according to one embodiment of the invention. FIG. 6B is an enlarged partial view of the backrest of FIG. 6A. As illustrated in FIG. 6A-6B, first engaging portion 170 of backrest 82 is positioned at bottom portion 112 of backrest 82 and comprises a series of first sleeves 180 laterally spaced apart from each other along a bottom portion 112 of backrest 82 with a plurality of recesses 182 interposed between the first sleeves 180. In one embodiment, as previously illustrated in FIG. 5B, a rod 172 extends through the sleeves 180 for pivotally connecting second engaging portion 190 of seat portion 84 relative to first engaging portion 170 of backrest 82.

In another aspect, as illustrated in FIG. 6A, backrest 82 comprises a body 162 including a latticework of rib members although in other aspects, backrest 82 defines a partially or completely solid member.

Figure 7A:
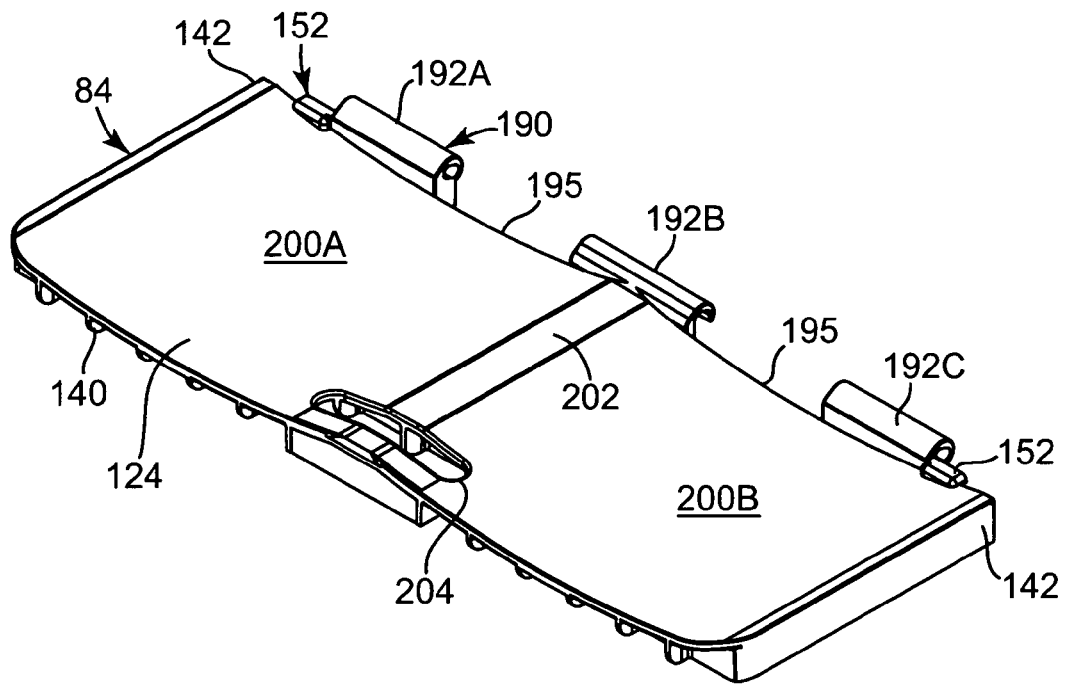
FIG. 7A is a perspective view of a seat portion of a seat assembly of a shopping vehicle, according to an embodiment of the invention.
Figure 7B:
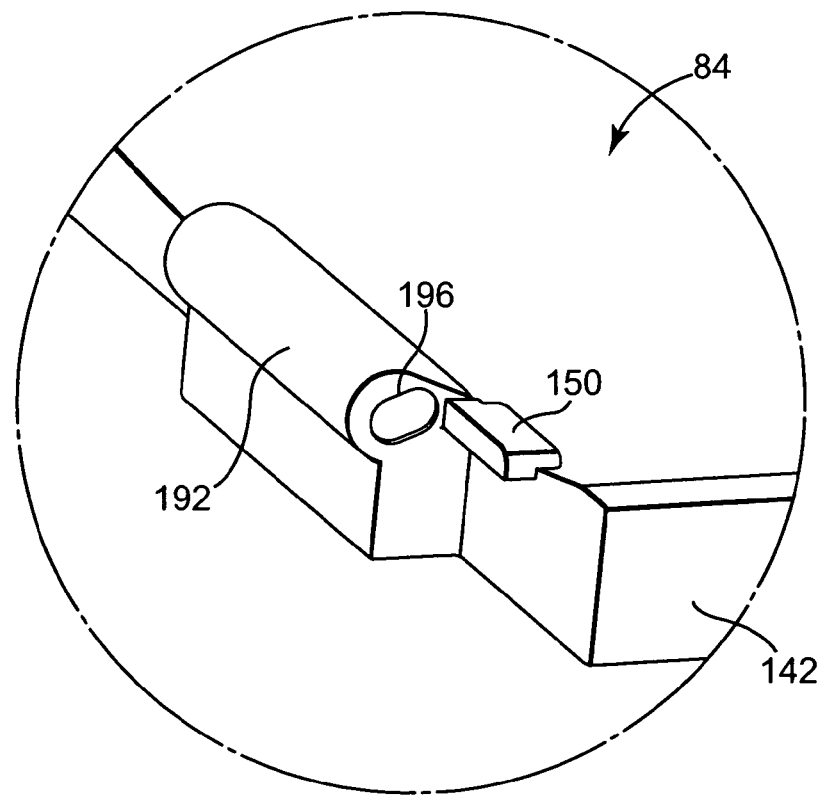
FIG. 7B is an enlarged partial perspective view the seat portion of FIG. 7A, according to an embodiment of the invention.
Figure 8:
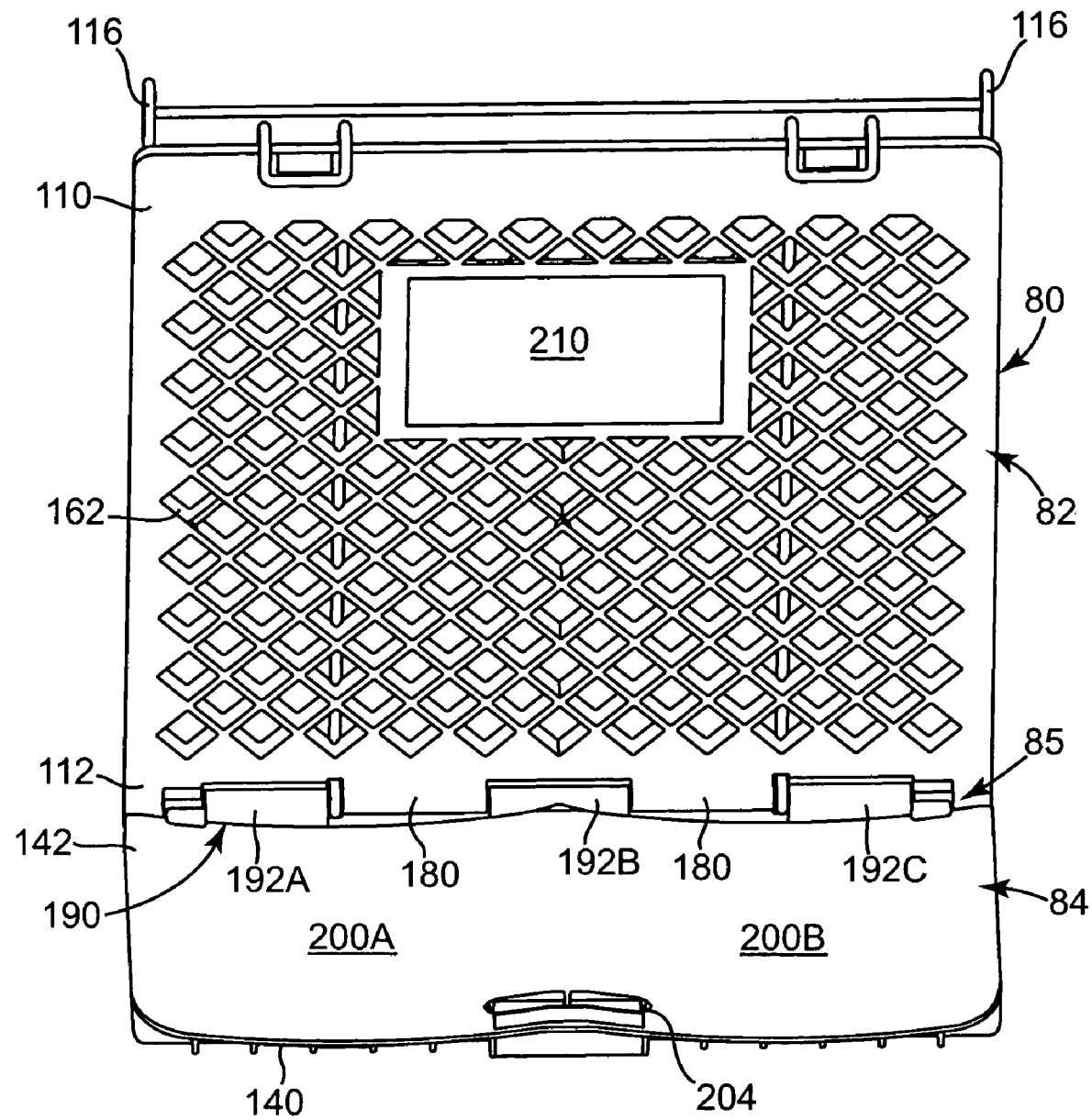
FIG. 8 is a front plan view of a seat assembly of a shopping vehicle, according to an embodiment of the invention.

FIG. 7A is a perspective view of seat portion 84 of seat assembly 80, according to one embodiment of the invention. FIG. 7A-7B is an enlarged partial view of the seat portion 84 of FIG. 7A. As illustrated in FIG. 7A, second engaging portion 190 of seat portion 84 is positioned adjacent inner end 142 of seat portion 84 and comprises a series of second sleeves 192A-192C laterally spaced apart from each other along inner end 142 of seat portion 82 with gaps 195 interposed between adjacent sleeves 192. In one embodiment, center sleeve 192B interposed between gaps 195 is a partial sleeve as illustrated in FIG. 7A, while in another embodiment center sleeve 192B is a complete sleeve substantially identical to the outer sleeves 194A and 194C. In one aspect, second sleeves 192A-192C of seat portion 84 are sized and spaced to directly offset the position of and to reciprocate the size and spacing of the first sleeves 180 of the first engaging portion 170 of backrest 82. Accordingly, in one aspect, pivot mechanism 85 comprises the first engaging portion 170 of backrest 82 being releasably matable with the second engaging portion 190 of seat portion 84 via interleaving the respective first sleeves 180 and second sleeves 192A-192C together, as illustrated in FIG. 8, with rod 172 (FIG. 5B) extending through both the first sleeves 180 and the second sleeves 192A-192C to maintain their relative position. Accordingly, this arrangement enables pivotal movement of seat portion 84 relative to backrest 82.

In one aspect, as illustrated in FIG. 7B, each second sleeve 192A and 192C of second engaging portion 190 protrudes from inner end 142 of seat portion 84 and defines a hole 196 having a generally elongate cross-sectional shape to facilitate slidable movement of seat portion 84 relative to rod 172 (FIG. 5B) during slidable insertion or slidable removal of flange 152 of seat portion 84 relative to slot 162 of backrest 82 (as illustrated in FIG. 5B. This feature of second pivot mechanism 85 facilitates releasable locking of seat portion 84 relative to backrest 82 of seat assembly 80.

In another aspect, as illustrated in FIG. 7A, seat portion 84 comprises a partially or completely solid member although in other aspects, seat portion 84 defines a generally ribbed structure. In another aspect, as illustrated in FIG. 7A, top surface 124 of seat portion 84 of seat assembly 80 defines a pair of generally concave depressions 200A, 200B to enhance seating of a child in each of the respective depressions 200A, 200B on opposite side of a midportion 202 of the top surface 124 of seat portion 84.

In another embodiment, seat portion 84 comprises a recessed handle portion 204 to assist a user in grasping seat portion 84 to maneuver seat portion 84 between the generally horizontal seating position (FIGS. 1-3) and the closed, upright storage position (FIG. 5A).

FIG. 8 is a front plan view of seat assembly 80, according to one embodiment of the invention. As illustrated in FIG. 8, seat assembly 80 comprises substantially the same features and attributes as seat assembly 80 as previously described and illustrated in association with FIGS. 1-7B. In addition, FIG. 8 further illustrates second pivot mechanism 85 including the interleaving of sleeves 180 of first engaging portion 170 of seat portion 84 with sleeves 192A-192C of second engaging portion 190 of backrest 82 of seat assembly. FIG. 8 also further illustrates first pivot mechanism 88 including hooks 116 on opposite sides of backrest 82 for pivotally engaging a portion of support structure 62 (FIGS. 1-3). In another aspect, FIG. 8 illustrates a display portion 210 formed on body 162 of backrest 82 for advertising, warning information, or other information.

Finally, while not illustrated in FIGS. 1-8, it is understood that seat assembly 80 would include a safety strap or harness, as is customary, for securing a child seated on seat assembly 80.

Embodiments of the invention enable convenient, comfortable, and efficient shopping by a consumer via a shopping vehicle that includes a utility portion extending rearward from a main cart to provide a first cargo zone and a second cargo zone. The utility portion also includes a seat assembly configured to make the utility portion of the shopping vehicle convertible between a passenger mode for carrying children and a cargo mode for use of the first and second cargo zones.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A shopping vehicle comprising:
   a wheeled chassis supporting:
      a main cart including a front portion, a rear portion, a basket, and a tray, the tray vertically spaced from and positioned below the basket; and
      a utility portion extending rearward from the rear portion of the main cart and including:
         a generally horizontal platform extending in generally the same plane as the tray of the main cart and adjacent to the tray of the main cart to define a substantially continuous loading surface extending on both the tray of the main cart and the generally horizontal platform of the utility portion;
         a support structure spaced from the rear portion of the main cart and extending generally vertically upward from and generally perpendicular to the generally horizontal platform, wherein the generally horizontal platform and the support structure of the utility portion in combination with the rear portion of the main cart together define a first cargo zone; and
         a panel pivotally mounted to the support structure for pivotal movement between a first position in which the panel is in a generally vertical position and generally parallel to the support structure to further define the first cargo zone and a second position in which the panel is in a generally horizontal position spaced vertically above the platform and generally perpendicular to the support structure to facilitate nesting of other carts relative to the utility portion of the shopping vehicle, the panel comprising a seat assembly including:
            a backrest pivotally mounted to the support structure via a first pivot mechanism; and
            a seat portion pivotally mounted to the backrest via a second pivot mechanism, the seat portion being pivotally movable between a generally horizontal seating position and a generally vertical storage position in which the seat portion is releasably lockable via the second pivot mechanism into the storage position.

2. The shopping vehicle of claim 1 wherein a second cargo zone is defined by the substantially continuous loading surface with the second cargo zone extending substantially continuously through the main cart between the basket and the tray, and through the utility portion between the support structure and the generally horizontal platform.

3. The shopping vehicle of claim 1 wherein the second pivot mechanism comprises at least one flange on the seat portion and a slot mechanism on the backrest for slidably receiving the at least one flange of the seat portion to releasably lock the seat portion into the storage position.

4. The shopping vehicle of claim 3 wherein the second pivot mechanism comprises:
   a rod;
   at least one first sleeve positioned on the seat portion and adjacent to the at least one flange of the seat portion, the at least one first sleeve defining a hole having an elongate cross-sectional shape; and
   at least one second sleeve positioned on the backrest and adjacent to the slot mechanism of the backrest, wherein the at least one first sleeve is interleaved relative to the at least one second sleeve with the rod extending through the at least one first sleeve and the at least one second sleeve.

5. The shopping vehicle of claim 1 wherein the utility portion comprises a first side and a second side opposite from the first side, the support structure comprising a pair of vertical side portions spaced apart from each other on the opposite respective sides of the utility portion with each vertical side portion extending upward from and generally perpendicular to the generally horizontal platform.

6. The shopping vehicle of claim 5 wherein the support structure comprises:
   a first transverse bar extending transversely across the utility portion between the vertical side portions of the support structure and positioned to vertically support the seat portion of the seat assembly in the seating position; and
   a second transverse bar extending transversely across the utility portion between the vertical side portions of the support structure at a location rearward of the first transverse bar and positioned vertically higher than the first transverse bar to limit rearward pivotal movement of the backrest of the seat assembly.

7. The shopping vehicle of claim 6 wherein the support structure comprises a first opening between the vertical side portions and below the second transverse bar, and the main cart comprises a second opening between the basket and the tray of the main cart adjacent the rear portion of the main cart, wherein the first opening and the second opening form an unobstructed passageway that defines a second cargo zone.

8. The shopping vehicle of claim 1 wherein the support structure comprises a handle including an items holder.

9. The shopping vehicle of claim 1 wherein the wheeled chassis comprises a single, unitary frame member that supports and defines both the main cart and the utility portion of the shopping vehicle.

10. The shopping vehicle of claim 1 wherein the utility portion is a separate unit from the main cart and is removably attachable to the rear portion of the main cart to form the shopping vehicle.

11. A conversion unit for a shopping cart, the conversion unit comprising:
   a frame including a front portion and a rear portion, the front portion of the frame being removably attachable to a rear portion of a shopping cart, the frame supporting a generally horizontal platform and a support structure, the generally horizontal platform extending between the front portion and the rear portion of the frame, and the support structure extending generally vertically upward from the rear portion of the frame to be generally perpendicular to the generally horizontal platform, wherein the generally horizontal platform defines a first cargo zone; and
   a panel pivotally mounted to the support structure for pivotal movement between a first position in which the panel is in a generally vertical position and generally parallel to the support structure to further define the first cargo zone and a second position in which the panel is in a generally horizontal nesting position that is generally perpendicular to the support structure to facilitate nesting of a second cart relative to the rear portion of the frame of the conversion unit, the panel comprising a seat assembly including a backrest and a seat portion, the backrest having a top portion and a bottom portion and being pivotally mounted to the support structure at the top portion of the backrest via a first pivot mechanism for pivotal movement of the seat assembly between the first position and the second position, wherein the seat portion of the seat assembly includes an outer end and an inner end that is pivotally mounted to the backrest of the seat assembly via a second pivot mechanism, the seat portion being pivotally movable relative to the backrest between a first position in which the seat portion is releasably locked into a generally vertical position with the seat portion extending generally vertically relative to the backrest and a second position in which the outer end of the seat portion is free hanging and the seat portion extends generally horizontally relative to the backrest for seating passengers.

12. The conversion unit of claim 11, comprising a system including the conversion unit and further comprising a shopping cart including a front portion and a rear portion, the front portion of the conversion unit being removably attached to the rear portion of the shopping cart.

13. The conversion unit of claim 12 wherein the shopping cart comprises a basket and a tray vertically spaced below the basket, wherein the tray of the shopping cart and the generally horizontal platform of the conversion unit define a substantially continuous and unobstructed passageway, the passageway defining a second cargo zone that extends from the front portion of the shopping cart between the basket and the tray of the shopping cart and over the generally horizontal platform of the conversion unit through the support structure adjacent the rear portion of the conversion unit.

14. A method of using a shopping vehicle comprising:
arranging a shopping vehicle to include a main cart and a utility portion extending rearward from the main cart;
arranging the utility portion to include a platform extending in generally a same plane as a tray of the main cart, a support structure extending generally vertically upward from the platform, and a seat assembly pivotally supported on the support structure above the platform; and
unlocking the seat assembly and converting the utility portion between a cargo mode and a passenger mode via hand operation of a releasable locking mechanism of the seat assembly including a backrest and a seat portion having an outer end and an inner end pivotally attached to the backrest at a pivot mechanism including a slot and a flange releasably locked in the slot, wherein unlocking the seat assembly includes pulling the seat portion generally vertically away from the backrest to slidably remove the flange from the slot, the cargo mode comprising positioning of the seat assembly in a closed position to facilitate placement of items on the platform in a first cargo zone between the main cart and the seat assembly of the utility portion, and the passenger mode comprising positioning the seat assembly in an open position for supporting a passenger on the platform and the seat assembly.

15. The method of claim 14 wherein arranging the shopping vehicle comprises:
arranging the main cart with a basket vertically spaced above the tray and arranging the platform adjacent to the tray of the main cart; and
operating the shopping vehicle in the cargo mode including placement of items in a second cargo zone, the second cargo zone of the shopping vehicle extending between the basket and the tray of the main cart and over the platform of the utility portion below the seat assembly of the utility portion.

16. The method of claim 14 and further comprising:
releasably nesting a second shopping cart relative to the shopping vehicle by the second shopping cart forcing pivotal movement of the seat assembly upward into a generally horizontal nesting position that is generally parallel to the platform of the utility portion of the shopping vehicle.

17. The method of claim 14 wherein arranging the shopping vehicle comprises removably attaching the utility portion to the main cart.

18. A shopping vehicle comprising:
a wheeled chassis supporting:
a main cart including a front portion, a rear portion, a basket, and a tray, the tray vertically spaced from and positioned below the basket; and
a utility portion extending rearward from the rear portion of the main cart and including:
a generally horizontal platform extending in generally the same plane as the tray of the main cart and adjacent to the tray of the main cart to define a substantially continuous loading surface extending on both the tray of the main cart and the generally horizontal platform of the utility portion;
a support structure spaced from the rear portion of the main cart and extending generally vertically upward from and generally perpendicular to the generally horizontal platform, wherein the generally horizontal platform and the support structure of the utility portion in combination with the rear portion of the main cart together define a first cargo zone; and
a panel pivotally mounted to the support structure for pivotal movement between a first position in which the panel is in a generally vertical position and generally parallel to the support structure to further define the first cargo zone and a second position in which the panel is in a generally horizontal position spaced vertically above the platform and generally perpendicular to the support structure to facilitate nesting of other carts relative to the utility portion of the shopping vehicle, the panel comprising a seat assembly including:
a backrest pivotally mounted to the support structure via a first pivot mechanism; and
a seat portion pivotally mounted to the backrest via a second pivot mechanism, the seat portion being pivotally movable between a generally horizontal seating position and a generally vertical storage position in which the seat portion is releasably lockable via the second pivot mechanism into the storage position, the second pivot mechanism comprising:
at least one flange on the seat portion;
a slot mechanism on the backrest for slidably receiving the at least one flange of the seat portion to releasably lock the seat portion into the storage position;
a rod;
at least one first sleeve positioned on the seat portion and adjacent to the at least one flange of the seat portion, the at least one first sleeve defining a hole having an elongate cross-sectional shape; and
at least one second sleeve positioned on the backrest and adjacent to the slot mechanism of the backrest, wherein the at least one first sleeve is interleaved relative to the at least one second sleeve with the rod extending through the at least one first sleeve and the at least one second sleeve.

19. A shopping vehicle comprising:
a wheeled chassis supporting:
   a main cart including a front portion, a rear portion, a basket, and a tray, the tray vertically spaced from and positioned below the basket; and
   a utility portion extending rearward from the rear portion of the main cart and including:
      a first side;
      a second side opposite from the first side;
      a generally horizontal platform extending in generally the same plane as the tray of the main cart and adjacent to the tray of the main cart to define a substantially continuous loading surface extending on both the tray of the main cart and the generally horizontal platform of the utility portion;
      a support structure spaced from the rear portion of the main cart and extending generally vertically upward from and generally perpendicular to the generally horizontal platform, wherein the generally horizontal platform and the support structure of the utility portion in combination with the rear portion of the main cart together define a first cargo zone, the support structure comprising a pair of vertical side portions spaced apart from each other on the opposite respective sides of the utility portion with each vertical side portion extending upward from and generally perpendicular to the generally horizontal platform; and
      a panel pivotally mounted to the support structure for pivotal movement between a first position in which the panel is in a generally vertical position and generally parallel to the support structure to further define the first cargo zone and a second position in which the panel is in a generally horizontal position spaced vertically above the platform and generally perpendicular to the support structure to facilitate nesting of other carts relative to the utility portion of the shopping vehicle, the panel comprising a seat assembly including:
         a backrest pivotally mounted to the support structure via a first pivot mechanism; and
         a seat portion pivotally mounted to the backrest via a second pivot mechanism, the seat portion being pivotally movable between a generally horizontal seating position and a generally vertical storage position in which the seat portion is releasably lockable via the second pivot mechanism into the storage position;
      wherein the support structure further comprises:
         a first transverse bar extending transversely across the utility portion between the vertical side portions of the support structure and positioned to vertically support the seat portion of the seat assembly in the seating position; and
         a second transverse bar extending transversely across the utility portion between the vertical side portions of the support structure at a location rearward of the first transverse bar and positioned vertically higher than the first transverse bar to limit rearward pivotal movement of the backrest of the seat assembly.

20. The shopping vehicle of claim 19 wherein the support structure comprises a first opening between the vertical side portions and below the second transverse bar, and the main cart comprises a second opening between the basket and the tray of the main cart adjacent the rear portion of the main cart, wherein the first opening and the second opening form an unobstructed passageway that defines a second cargo zone.

* * * * *